(12) United States Patent
Tamlin

(10) Patent No.: US 10,197,129 B2
(45) Date of Patent: Feb. 5, 2019

(54) SUSPENSION SYSTEM WITH HORIZONTAL ELASTIC MEMBERS

(71) Applicant: Mayfran International, Inc., Mayfield Village, OH (US)

(72) Inventor: Paul Robert Tamlin, Lindsay (CA)

(73) Assignee: Mayfran International, Inc., Cleveland, OH (US)

( * ) Notice: Subject to any disclaimer, the term of this patent is extended or adjusted under 35 U.S.C. 154(b) by 0 days.

(21) Appl. No.: 15/343,915

(22) Filed: Nov. 4, 2016

(65) Prior Publication Data

US 2017/0130804 A1    May 11, 2017

Related U.S. Application Data

(60) Provisional application No. 62/251,310, filed on Nov. 5, 2015.

(51) Int. Cl.

| | | |
|---|---|---|
| *B65G 27/08* | (2006.01) |
| *F16F 15/04* | (2006.01) |
| *B65G 25/06* | (2006.01) |
| *F16F 1/02* | (2006.01) |
| *F16F 1/37* | (2006.01) |
| *B65G 27/12* | (2006.01) |
| *F16F 1/373* | (2006.01) |
| *F16F 1/364* | (2006.01) |
| *F16F 1/366* | (2006.01) |

(52) U.S. Cl.
CPC ............. *F16F 15/04* (2013.01); *B65G 25/06* (2013.01); *B65G 27/08* (2013.01); *B65G 27/12* (2013.01); *F16F 1/021* (2013.01); *F16F 1/37* (2013.01); *F16F 1/3737* (2013.01); *F16F 1/364* (2013.01); *F16F 1/366* (2013.01); *F16F 2230/0005* (2013.01)

(58) Field of Classification Search
CPC ................................. B65G 27/08; F16F 15/04
USPC ............. 198/752.1, 758, 763, 764, 765, 771
See application file for complete search history.

(56) References Cited

U.S. PATENT DOCUMENTS

| | | | | |
|---|---|---|---|---|
| 6,705,459 | B1 * | 3/2004 | Musschoot | ............ B65G 27/08 198/763 |
| 7,192,341 | B2 * | 3/2007 | Takamisawa | ........ B65G 47/145 221/200 |
| 2009/0101480 | A1 * | 4/2009 | Fuyama | ................. B65G 27/20 198/759 |

* cited by examiner

*Primary Examiner* — Gene O Crawford
*Assistant Examiner* — Lester Ill Rushin
(74) *Attorney, Agent, or Firm* — Calfee, Halter & Griswold, LLP

(57) ABSTRACT

An exemplary suspension member for a reciprocating conveyor has a horizontally oriented resilient spring member, two bases, and a support. The spring member has a main body, two ends, and a center with a mounting portion. Each base has a retention portion for retaining an end of the spring member. The support supports a tray disposed on top of the mounting portion and has at least one support member extending downward to engage the mounting portion.

20 Claims, 7 Drawing Sheets

SUSPENSION SYSTEM WITH HORIZONTAL ELASTIC MEMBERS

CROSS-REFERENCE TO RELATED APPLICATIONS

The present application claims the benefit of U.S. Provisional Application Ser. No. 62/251,310, filed on Nov. 5, 2015, titled LOW PROFILE SUSPENSION SYSTEM WITH HORIZONTAL ELASTIC MEMBERS, the disclosure of which is incorporated herein by reference in its entirety.

TECHNICAL FIELD

The present invention relates generally to conveyor systems and suspensions for conveyor systems.

BACKGROUND OF THE INVENTION

Conveyor systems are known to those skilled in the art, e.g. belt systems, roller systems, and vibrating systems. Conveyor systems receive media and carry it over a distance to deliver the media at a destination location, which can be another conveyor system. The type of conveyor selected is dependent on the media to be moved. For example, a roller conveyor system would not be used with media that could fall between the rollers. A suspension for a conveyor system supports the weight of the conveyor and the media being conveyed.

In some cases, conveyor systems are installed underneath equipment to convey material away from the equipment to another location. The height of the media and the conveyor often cannot be changed in these applications. Thus, vertical space is saved by reducing the height of the suspension.

Applicants have appreciated the need for a low vertical profile suspension system to reduce the vertical space required by the conveyor system while maintaining conveyor performance.

SUMMARY

Exemplary embodiments of suspension members and suspension systems for reciprocating conveyors are disclosed herein.

An exemplary suspension member for a reciprocating conveyor system has a horizontally oriented resilient spring member, two bases, and a support. The spring member has a main body, two ends, and a mounting portion. Each base has a retention portion for retaining an end of the spring member. The support supports a tray disposed on top of the mounting portion and has at least one support member extending downward to engage the mounting portion.

An exemplary suspension system for a reciprocating conveyor system includes a plurality of suspension members, a tray, and a drive unit for reciprocating the tray. The suspension members each have a horizontally oriented spring member, two bases, and a support. The spring member has a main body, two ends, and a mounting portion. Each base has a retention portion for retaining an end of the spring member. The support has at least one support member extending downward to engage the mounting portion. The tray is disposed on top of the supports of the suspension members.

Still another exemplary embodiment of the present disclosure relates to a method for conveying media using a reciprocating conveyor. The method includes providing a reciprocating conveyor and reciprocating a tray of the reciprocating conveyor more slowly in a direction of travel than in a return direction to cause the media to move along the tray in the direction of travel. The reciprocating conveyor includes: a plurality of suspension members; a tray disposed on top of the suspension members; and a drive unit for reciprocating the tray. Each suspension member has a horizontally oriented spring member, two bases, and a support. Each base has a retention portion for retaining an end of the spring member. The spring members have a main body, two ends, and a center with a mounting portion. The supports are disposed on top of the mounting portions and have at least one support member that extends downward from the support to engage the mounting portion.

BRIEF DESCRIPTION OF THE DRAWINGS

These and other features and advantages of the present invention will become better understood with regard to the following description and accompanying drawings in which.

DETAILED DESCRIPTION

Figure 1A:
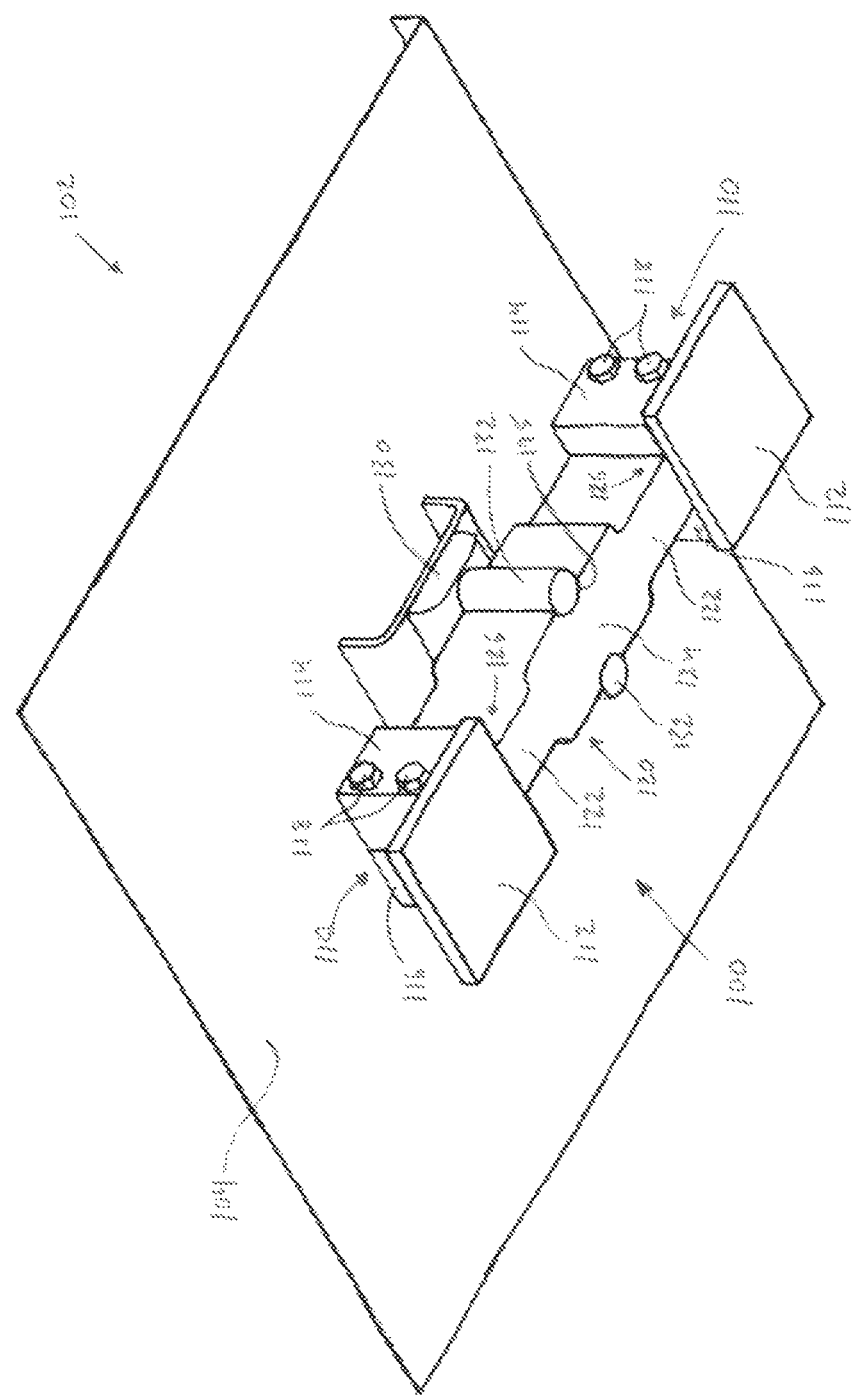
FIG. 1A is a bottom, left, front perspective view of an exemplary suspension member.
Figure 1B:
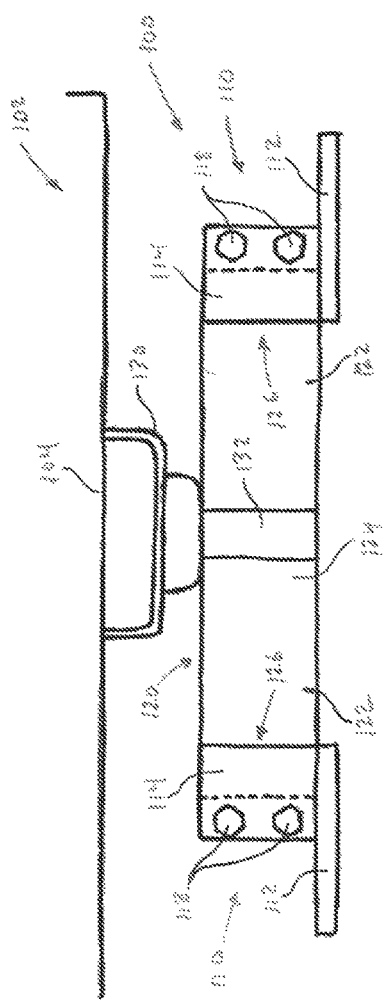
FIG. 1B is a front view of the exemplary suspension member of FIG. 1A.
Figure 1C:
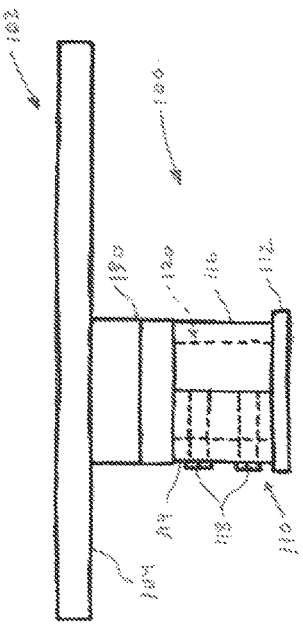
FIG. 1C is a right side view of the exemplary suspension member of FIG. 1A.
Figure 1D:
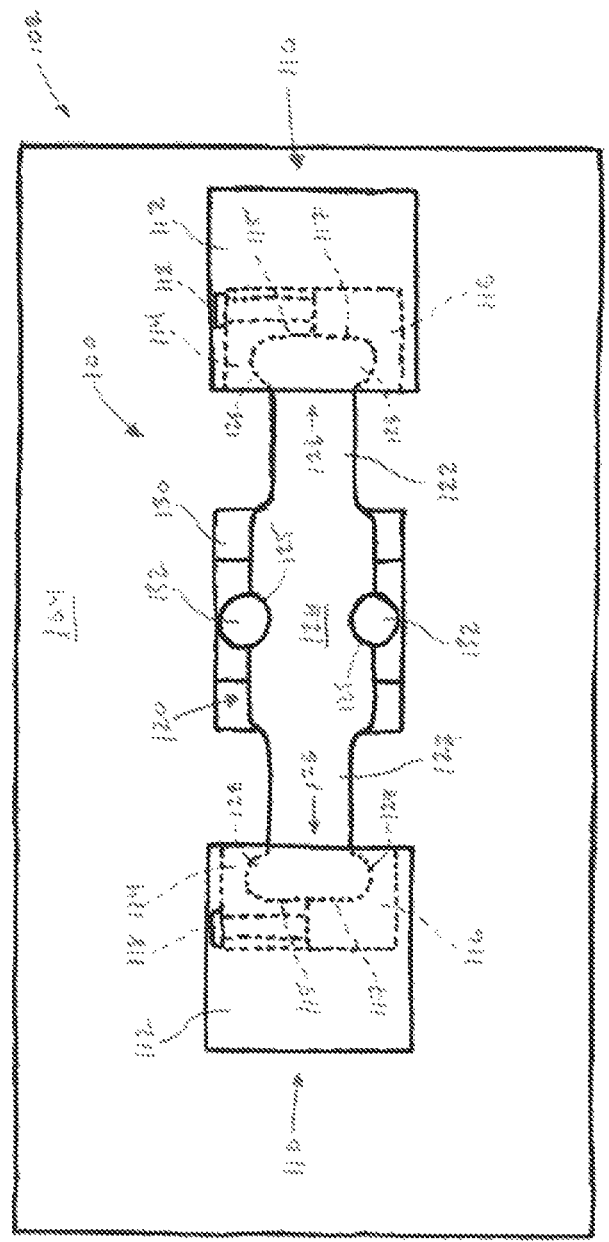
FIG. 1D is a bottom view of the exemplary suspension member of FIG. 1A.

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless a limiting definition is expressly provided herein.

Referring now to FIGS. 1A-1D, an exemplary suspension member 100 for a reciprocating conveyor 102 is shown. As used herein, the term "reciprocating" (and "reciprocate" and similar other forms) means movement back and forth without regard to velocities, accelerations, and decelerations in the movement back and forth, unless the context dictates otherwise. The exemplary suspension member 100 includes two clamps 110, a horizontally oriented resilient spring member 120, and a support 130 with two downwardly extending support members 132 for engaging the spring member 120.

An exemplary tray 104 of the reciprocating conveyor 102 is supported on top of the exemplary spring member 120 by the support 130. While the tray 104 is shown as a flat plate in FIGS. 1A-1D, the tray can take on any shape. For example, the tray 104 can be generally concave and can include one or more sides that prevent media from falling off of the tray 104. In some exemplary embodiments, the tray 104 is formed of steel, but can be formed of any suitably rigid and strong material.

The exemplary clamps 110 include a clamp base 112, a moveable clamp member 114, and a fixed clamp member 116. The clamp bases 112 are attached to a floor surface (not shown) by any connecting means, such as, for example, fasteners, by embedding the bases 112 in a concrete floor, or the like. The fixed clamp member 116 is attached to the base 112. In some embodiments, the fixed clamp member 116 and the base 112 are formed as a single component. The moveable clamp member 114 is secured to the fixed clamp member 116 by clamp fasteners 118. Tightening the fasteners 118 pulls the moveable clamp member 114 toward the fixed clamp member 116 to close the clamp 110. Loosening the fasteners 118 allows the moveable clamp member 114 to be pulled away from the fixed clamp member 116 to open the clamp 110. The clamp members 114, 116 may be held together by any fastening means, such as, for example, a nut and bolt connection, a cam lock connection, a cotter pin connection, or the like. The clamp members 114, 116 may also be connected by a hinged connection, a sliding connection, or the like. In the closed position, the clamps 110 secure the horizontally oriented resilient spring member 120 to the floor surface (not shown).

The exemplary horizontally oriented resilient spring member 120 has a flexible main body 122, a mounting portion 124, and two ends 126. In this exemplary embodiment, each end 126 of exemplary spring member 120 has two lobes 128 that give the spring member 120 a "dog bone" shape. The flexible main body 122 of the spring member 120 is suspended above the floor surface (not shown) between the ends 126 that are held by the clamps 110. The clamps 110 clamp onto the ends 126 to limit the movement of the ends 126 in at least two directions (i.e., side-to-side and front-to-back). Thus, when the mounting portion 124 of the spring member 110 is moved relative the clamps 110, the main body 122 flexes with the movement while the ends 126 remain fixed in the clamps 110.

The exemplary moveable and fixed clamp members 114, 116 have recesses 115, 117 that receive the lobes 128 of the ends 126 of the spring member 120. When a moveable clamp member 114 is tightened against a fixed clamp member 116 to close the clamp 110 on an end 126 of the spring 120, the lobes 128 and recesses 115, 117 fit together like puzzle pieces. That is, the lobes 128 and recesses 115, 117 are male and female versions of essentially the same shape, respectively. The lobes 128 at the ends 126 of the spring 120 are larger than the opening in the clamp 110 when it is closed, preventing the ends 126 from pulling out of the clamps 110 when they are closed. Thus, no holes that could weaken the material are needed in the spring member 120; i.e., the spring member 120 is imperforate. While the lobes 128 are shown with a rounded shape, they may be any shape that can be retained by the clamp members 114, 116.

The flexible main body 122 has a rectangular cross-section that is taller than it is wide. Thus, the spring member 120 deflects more when subjected to a horizontal force than when subjected to the same force in the vertical direction. For example, the main body 122 is rigid enough in the vertical direction to support the weight of tray 104 and media above the floor surface, yet is flexible enough in the horizontal direction to allow the tray 104 to reciprocate back and forth to convey media. In some exemplary embodiments, the flexible main body 122 of the exemplary spring 120 is (and the entire exemplary spring 120 can be) formed of rubber, but can be formed of any suitably resilient material. The flexible main body 122 of the spring member 120 is shown as a rectangular beam, but may have any cross-sectional shape that is sufficiently rigid in the vertical direction and flexible in the horizontal direction. In some exemplary embodiments, for example, the cross-sectional shape of the spring member 120 may be varied by including protrusions, grooves, and/or ridges to increase or reduce the stiffness of the spring member 120 in a particular direction.

The mounting portion 124 of the spring member 120 is thicker than the main body 122 to allow for recesses 125 in its sides without reducing the thickness of the main body 122. The recesses 125 are configured to receive support members 132 of the support 130. While the mounting portion 124 is shown as an integral part of the spring member 120, a separate component could be used to interface with the spring member 120 and the support 130. For example, a saddle component could ride on the flexible main body 122 of the spring member 120 and carry the support 130.

During use, the tray 104 is moved back and forth by a conveyor drive system (not shown) such that media on top of the tray 104 is conveyed along the conveyor 102. The force moving the tray 104 is transmitted to the spring member 120 through the support 130 that is mounted on the spring member 120. As the tray 104 is moved in a direction of conveyance, the spring 120 deforms horizontally. At a maximum stroke of the tray 104 the potential energy in the spring member 120 is at its highest. When the tray 104 is moved backward in a return direction, the resilient spring member 120 returns to its original position, assisting the motion of the tray 104. This is a cycle that is repeated at each end of the stroke of the tray 104, thereby improving the efficiency of the conveyor system 102 relative to prior art roller-based conveyor systems.

Figure 2:
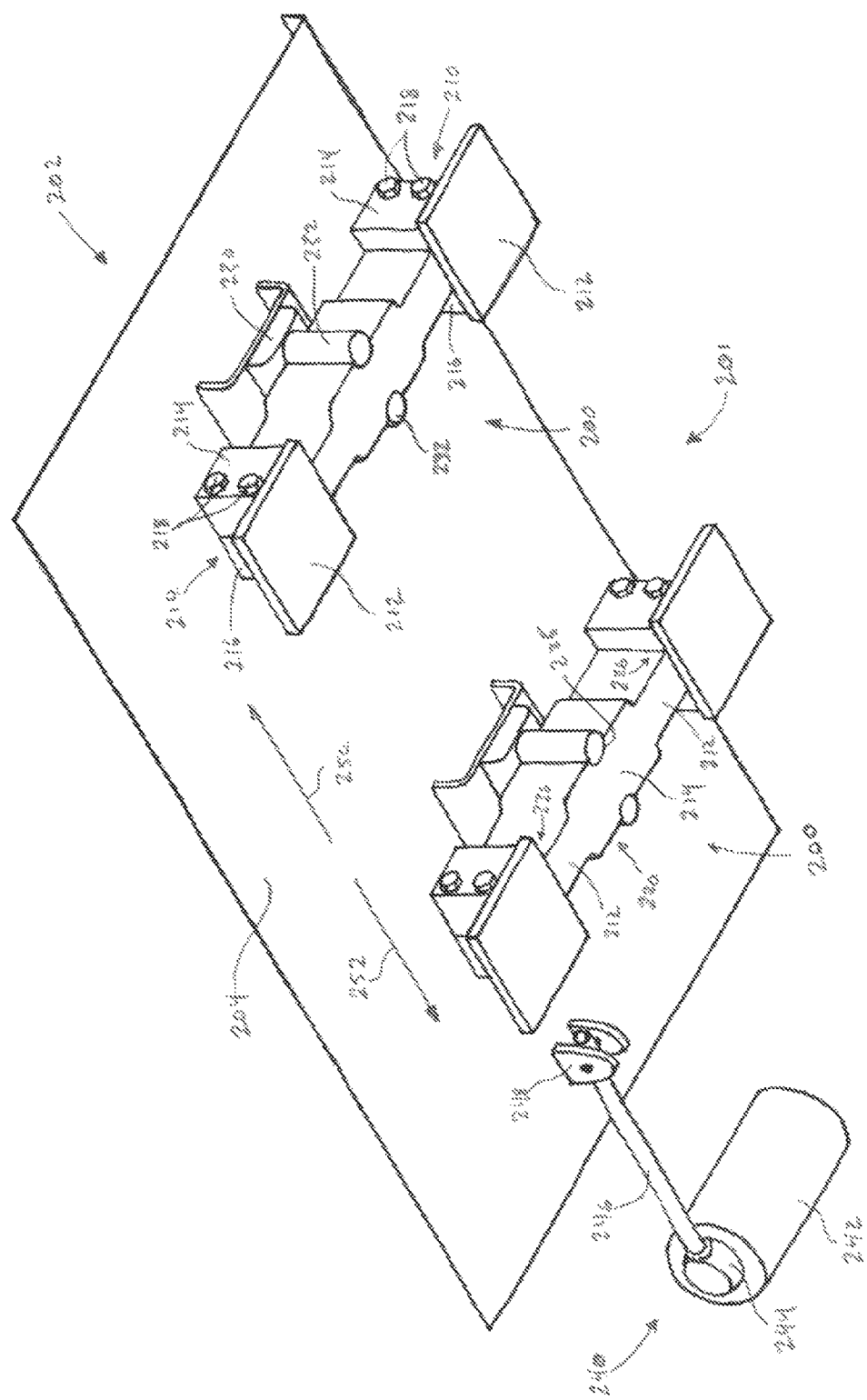
FIG. 2 is a bottom, left, front perspective view of an exemplary conveyor suspension system.

Referring now to FIG. 2, an exemplary reciprocating conveyor suspension system 201 for a reciprocating conveyor 202 is shown. The suspension system 201 includes a plurality of suspension members 200 and a drive system 240. The suspension system 201 supports a tray 204 of the reciprocating conveyor 202. In an exemplary embodiment, a tray that is about four feet by about ten feet might have 6-12 suspension members, e.g., eight (8) suspension members 200, and be capable of holding and oscillating at least 500 pounds (including the weight of the tray).

In exemplary embodiments, each suspension member 200 is like the suspension member 100 described above. The suspension members 200 include two clamps 210, a horizontally oriented resilient spring member 220, and a support 230 with two downwardly extending support members 232 for engaging the spring member 220.

The tray 204 of the reciprocating conveyor 202 is supported above of the spring members 220 by the supports 230. The clamps 210 include a clamp base 212, a moveable clamp member 214 and a fixed clamp member 216. The moveable clamp members 214 are secured to the fixed clamp members 216 by clamp fasteners 218. The horizontally oriented resilient spring member 220 has a flexible main body 222, a mounting portion 224, and two ends 226. Each end 226 has two lobes 228 that give the spring member 220 a "dog bone" shape. The moveable and fixed clamp members 214, 216 have recesses 215, 217 that receive the lobes 228 of the ends 226 of the spring member 220.

During use, the tray 204 is moved back and forth by a drive unit 240 such that media on top of the tray 204 is conveyed along the conveyor 202 in a conveyance direction 250. The drive unit 240 has a motor 242, a drive mechanism 244, and an arm 246. The arm 246 is connected to the tray 204 by a resilient linkage 248 on the underside of the tray 204. The resilient linkage 248 can be, for example, Part No. ST60 by Rosta. The drive mechanism 244 connects the arm 246 to the motor 242. While a rotating motor is shown in FIG. 2, the tray 204 can be similarly reciprocated by a linear motor, a rotary actuator, a linear actuator, motor with variable frequency drive, or the like. In some exemplary embodiments, the drive mechanism 244 is a differential motion transmission box or "Shuffle Drive" similar to that described in the following patents and applications, all of which are incorporated herein by reference in their entireties: U.S. Pat. Nos. 6,215,212, 6,234,288, and 6,236,242; co-pending U.S. patent application Ser. No. 14/273,206, filed Jul. 18, 2014; and Canadian Patent No. 2,213,277. In other exemplary embodiments the drive mechanism 244 is a motor in a simple oscillating configuration (not shown) such as an arm (not shown) at the end of a motor drive shaft that simply vibrates the tray 204 back and forth (without the special accelerations and decelerations of a shuffle drive or the other drives incorporated by reference).

The drive mechanism 244 causes the arm 246 to drive the tray 204 in different motion configurations. For example, in some exemplary embodiments, the tray 204 is driven relatively slowly in the conveyance direction 250 (so that friction keeps the media in place on the tray 204) and relatively quickly in the opposite direction 252 (so that friction is overcome and the tray 204 slides underneath the media on the tray 204). This results in one movement phase of the media per back and forth cycle of the tray 204. Alternatively, the tray 204 is accelerated in the opposite direction 252 with rapid deceleration (so that friction is overcome and the tray 204 slides underneath the media), and then accelerated in the direction of conveyance 250 with slow deceleration (so that friction keeps the media in place on the tray 204). This results in two movement phases of the media per back and forth cycle of the tray 204. Other exemplary motions are discussed below and in the documents incorporated by reference. In a preferred embodiment, tray 204 is not simply vibrated back and forth, which is less efficient in moving material.

The displacement of the tray 204 can vary depending on the type of media being conveyed. In any event, the tray 204 can be moved so that it conveys media from one location to another. In some exemplary embodiments, the tray 204 is also inclined so that gravity will assist movement of the media in the direction of conveyance 250.

In some exemplary embodiments, the conveyor tray 204 has a period of about 0.3-1.0 seconds, or about 0.4-0.6 seconds, or about 0.5 seconds. That is, in exemplary embodiments, the tray 204 completes one complete cycle back and forth about every 0.3-1.0 seconds, or about every 0.4-0.6 seconds, or about every 0.5 seconds. Obviously, those skilled in the art can convert these periods to frequencies. In some exemplary embodiments, the stroke of the tray 204 is about 3 inches. In some exemplary embodiments, the above speeds and stroke of the tray 204 move the media across the tray 204 at about 20 feet/min. In some exemplary systems, the springs 220 are configured to provide movement of about one inch to about an inch and a half (~1"-1½") in each direction off of center, e.g., about an inch and a quarter (1¼") in either direction off of center. Other applications might require significantly more or less displacement.

Figure 3:
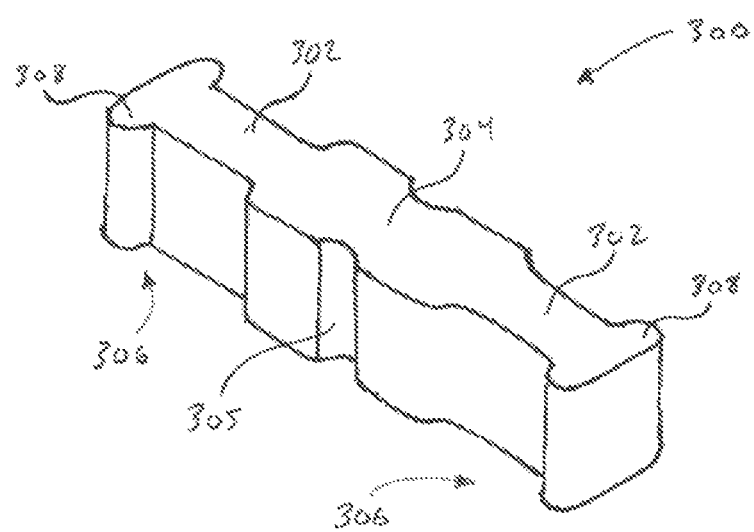
FIG. 3 is a top, right, front perspective view of an exemplary spring member.

Referring now to FIG. 3, an exemplary horizontally oriented resilient spring member 300 for a suspension member is shown. The spring member 300 has a flexible main body 302, a mounting portion 304, and two ends 306. In this exemplary embodiment, each end 306 of exemplary spring member 300 has two lobes 308 that give the spring member 300 a "dog bone" shape.

The flexible main body 302 has a rectangular cross-section that is taller than it is wide. Thus, the spring member 300 deflects more when subjected to a horizontal force than when subjected to the same force in the vertical direction. For example, the main body 302 is rigid enough in the vertical direction to support the weight of a tray (not shown) and media above the floor surface, yet is flexible enough in the horizontal direction to allow the tray (not shown) to reciprocate back and forth to convey media. The flexible main body 302 of the exemplary spring 300 is (and the entire exemplary spring 300 can be) formed of rubber, but can be formed of any suitably resilient material. The flexible main body 302 of the spring member 300 is shown as a rectangular beam, but may have any cross-sectional shape that is sufficiently rigid in the vertical direction and flexible in the horizontal direction. In some exemplary embodiments, for example, the cross-sectional shape of the spring member 300 may be varied by including protrusions, grooves, and/or ridges to increase or reduce the stiffness of the spring member 300 in a particular direction.

The mounting portion 304 of the spring member 300 is thicker than the main body 302 to allow for recesses 305 in its sides without reducing the thickness of the main body 302. The recesses 305 are configured to receive support members 132 of a support (not shown). While the mounting portion 304 is shown as an integral part of the spring member 300, a separate component could be used to interface with the spring member 300 and the support (not shown). For example, a saddle component could ride on the flexible main body 302 of the spring member 300 and carry the support (not shown).

Figure 4:
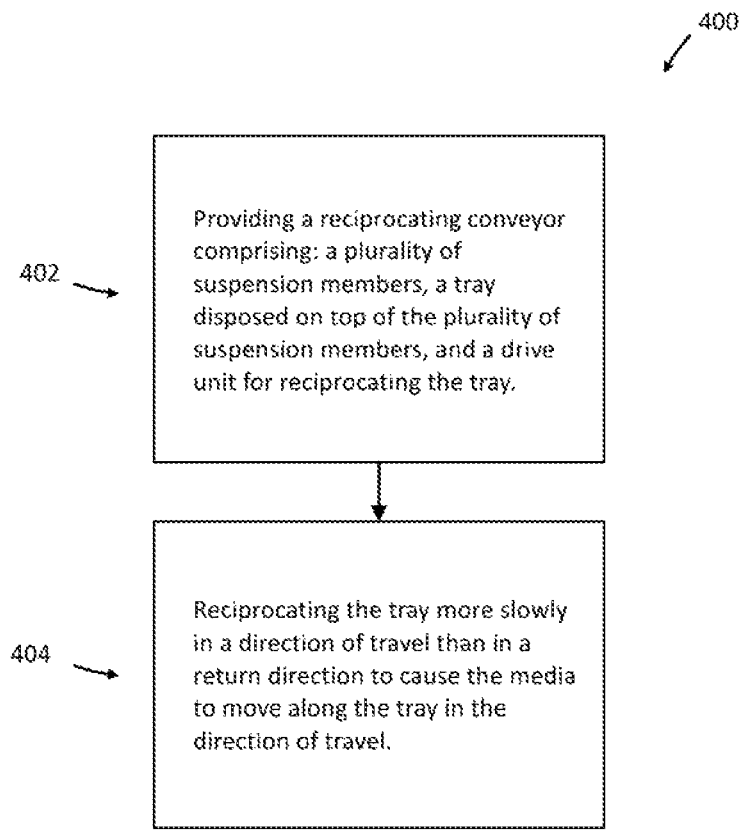
FIG. 4 is a flow chart describing the steps of an exemplary method for conveying media using a reciprocating conveyor.

Referring now to FIG. 4, a flow chart of an exemplary method 400 of conveying media using a reciprocating conveyor having suspension members is shown. The exemplary method 400 includes: providing a reciprocating conveyor comprising a plurality of suspension members, a tray disposed on top of the plurality of suspension members, and a drive unit for reciprocating the tray, at 402; and reciprocating the tray more slowly in a direction of travel than in a return direction to cause the media to move along the tray in the direction of travel, at 404. The exemplary method 400 can be implemented with any of the exemplary suspension members 100, 200, or another suspension system.

Figure 5:
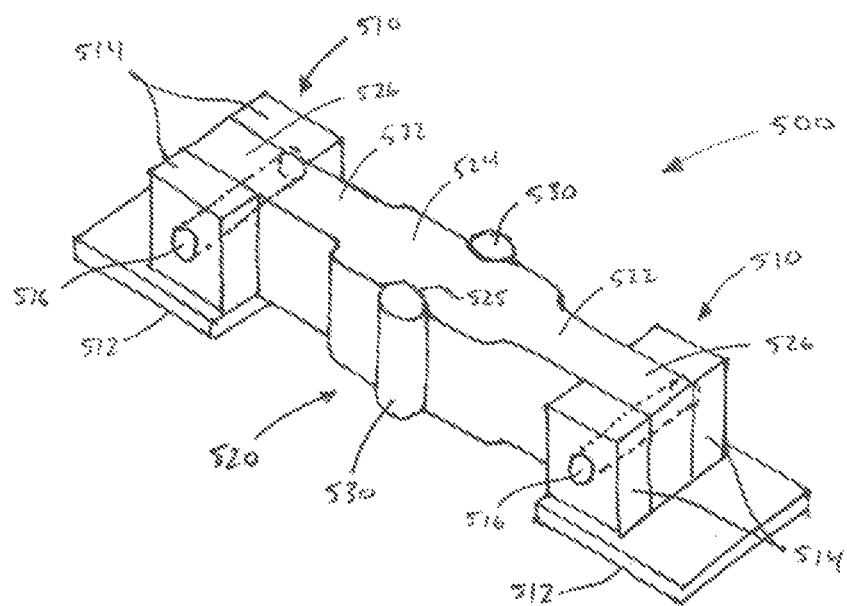
FIG. 5 is a top, right, front perspective view of another exemplary suspension member.

Referring now to FIG. 5, another exemplary suspension member 500 for a reciprocating conveyor is shown. The suspension member 500 is similar to the suspension members 100 and 200 described above. The exemplary suspension member 500 includes two retention blocks 510, a horizontally oriented resilient spring member 520, and a support members 530 for engaging the spring member 520. An exemplary tray (not shown) is supported on top of the spring member 520 by the support members 530.

The exemplary retention blocks 510 include a base 512 and two mounting members 514 attached to the base 512. The bases 512 are attached to a floor surface (not shown) by any connecting means, such as, for example, fasteners, by embedding the bases 512 in a concrete floor, or the like. In some embodiments, the mounting members 514 and the base 512 are formed as a single component. The spring member 520 is inserted between the mounting members 514 and secured with a fastener 516, e.g. a bolted connection, a pinned connection, or the like.

The exemplary horizontally oriented resilient spring member 520 has a flexible main body 522, a mounting portion 524, and two ends 526. The flexible main body 522 of the spring member 520 is suspended above the floor surface (not shown) between the ends 526 that are held by the retention blocks 510. The retention blocks 510 secure the ends 526 to limit their movement in at least two directions (i.e. side-to-side and front-to-back). Thus, when the mounting portion 524 of the spring member 510 is moved relative the retention blocks 510, the main body 522 flexes with the movement while the ends 526 remain fixed in the retention blocks 510.

The flexible main body 522 has a rectangular cross-section that is taller than it is wide. Thus, the spring member 520 deflects more when subjected to a horizontal force than when subjected to the same force in the vertical direction. For example, the main body 522 is rigid enough in the vertical direction to support the weight of a tray (not shown) and media above the floor surface, yet is flexible enough in the horizontal direction to allow a tray (not shown) to reciprocate back and forth to convey media. The flexible main body 522 of the exemplary spring 520 is (and the entire exemplary spring 520 can be) formed of rubber, but can be formed of any suitably resilient material. The flexible main body 522 of the spring member 520 is shown as a rectangular beam, but may have any cross-sectional shape that is sufficiently rigid in the vertical direction and flexible in the horizontal direction. In some exemplary embodiments, for example, the cross-sectional shape of the spring member 520 may be varied by including protrusions, grooves, and/or ridges to increase or reduce the stiffness of the spring member 520 in a particular direction.

The mounting portion 524 of the spring member 520 is thicker than the main body 522 to allow for recesses 525 in its sides without reducing the thickness of the main body 522. The recesses 525 are configured to receive support members 532 of the support 530. While the mounting portion 524 is shown as an integral part of the spring member 520, a separate component could be used to interface with the spring member 520 and the support members 530.

In some exemplary embodiments, the exemplary springs described herein are molded (or otherwise formed, e.g., milled from a piece of material) as a single unitary piece from rubber, or any other moldable material such as neoprene, graphite, fiberglass, and sufficiently dimensionally stable to support the desired load. In the alternative, the exemplary springs herein can be molded or otherwise formed in a plurality of parts that are affixed, e.g., adhered, welded, or otherwise affixed, or otherwise formed (e.g., milled) from a plurality of pieces of material that are affixed, e.g., adhered, welded, or otherwise affixed. In some exemplary embodiments, the exemplary springs are made of wood, e.g., solid wood or laminated wood. In some exemplary embodiments, the exemplary springs are made of steel, e.g., spring steel or composite leaf spring steel.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the ends of the springs may have rounded edges or squared edges. Accordingly, departures can be made from such details without departing from the spirit or scope of the applicant's general inventive concept.

What is claimed is:

1. A suspension member for a reciprocating conveyor comprising:
    a horizontally oriented resilient spring member having a main body, two ends, a horizontal center between the two ends, and a mounting portion at the center of the spring member;
    two bases, one at each end, each base having a retention portion for retaining an end of the spring member; and
    a support for supporting a tray disposed on top of the mounting portion having at least one support member that extends downward from the support to engage the mounting portion.

2. The suspension member of claim 1, wherein the mounting portion and support are moveable horizontally in a direction orthogonal to the spring member.

3. The suspension member of claim 1, wherein the retention portions of the bases prevent movement of the ends of the spring member in a horizontal direction orthogonal to the spring member and inward toward the center.

4. The suspension member of claim 1, wherein:
    each retention portion comprises a clamp having a fixed portion and a moveable portion secured together by at least one fastener;
    the fixed and moveable portions form a clamp receptacle when assembled; and
    each clamp receptacle is configured to receive an end of the spring member.

5. The suspension member of claim 1, wherein each end of the spring member has two lobes.

6. The suspension member of claim 1, wherein the spring member is imperforate.

7. The suspension member of claim 1, wherein:
    each retention portion comprises at least two retention members;
    each end of the spring member extends between the at least two retention members of each retention portion;
    each end of the spring member is secured to the retention members with at least one fastener that extends at least partially through the retention members and the end of the spring member.

8. The suspension member of claim 1, wherein:
    the support has two support members that are generally cylindrical in shape, one on each side of the spring member; and
    the mounting portion of the spring member has two semi-cylindrical grooves for receiving the support members.

9. The suspension member of claim 1, wherein both bases vertically overlap at least a portion of the at least one support member.

10. The suspension member of claim 1, wherein the spring member is capable of supporting at least 50 pounds.

11. The suspension member of claim 1, wherein the spring member is formed of rubber, neoprene, graphite, metal, wood, fiberglass, or the like.

12. A suspension system for a reciprocating conveyor comprising:
    a plurality of suspension members comprising:
        a horizontally oriented spring member having a main body, two ends, a horizontal center between the two ends, and a mounting portion at the center of the spring member;
        two bases, one at each end, each base having a retention portion for retaining an end of the spring member; and
        a support disposed on top of the mounting portion having at least one support member that extends downward from the support to engage the mounting portion;

a tray disposed on top of the plurality of supports of the plurality of suspension members; and a drive unit for reciprocating the tray.

13. The suspension system of claim 12, wherein the mounting portions and supports are moveable horizontally in a direction orthogonal to the spring members.

14. The suspension system of claim 12, wherein the retention portions of the bases prevent movement of the ends of the spring members in a horizontal direction orthogonal to the spring members and inward toward the center.

15. The suspension system of claim 12, wherein:
   each retention portion comprises a clamp having a fixed portion and a moveable portion secured together by at least one fastener;
   the fixed and moveable portions form a clamp receptacle when assembled; and
   each clamp receptacle is configured to receive an end of the spring member.

16. The suspension member of claim 12, wherein each end of each of the spring members has two lobes.

17. The suspension member of claim 12, wherein each spring member is imperforate.

18. The suspension member of claim 12, wherein:
   each retention portion comprises at least two retention members;
   each end of the spring member extends between the at least two retention members of each retention portion;
   each end of the spring member is secured to the retention members with at least one fastener that extends at least partially through the retention members and the end of the spring member.

19. The suspension member of claim 12, wherein:
   the support has two support members that are generally cylindrical in shape, one on each side of the spring member; and
   the mounting portion of the spring member has two semi-cylindrical grooves for receiving the support members.

20. A method for conveying media using a reciprocating conveyor, comprising:
   providing a reciprocating conveyor comprising:
      a plurality of suspension members comprising:
         a horizontally oriented spring member having a main body, two ends, a horizontal center between the two ends, and a mounting portion at the center of the spring member;
         two bases, one at each end, each base having a retention portion for retaining an end of the spring member; and
         a support disposed on top of the mounting portion having at least one support member that extends downward from the support to engage the mounting portion;
      a tray disposed on top of the plurality of supports of the plurality of suspension members; and
      a drive unit for reciprocating the tray; and
   reciprocating the tray more slowly in a direction of travel than in a return direction to cause the media to move along the tray in the direction of travel.

\* \* \* \* \*